(12) United States Patent
Gweon et al.

(10) Patent No.: US 7,324,273 B2
(45) Date of Patent: Jan. 29, 2008

(54) CONFOCAL SELF-INTERFERENCE MICROSCOPY FROM WHICH SIDE LOBE HAS BEEN REMOVED

(75) Inventors: Dae Gab Gweon, Daejeon (KR); Dong Kyun Kang, Daejeon (KR)

(73) Assignee: Eun Jin Sohn Patent & Law Office, Seoul (KR)

( * ) Notice: Subject to any disclaimer, the term of this patent is extended or adjusted under 35 U.S.C. 154(b) by 0 days.

(21) Appl. No.: 11/444,686

(22) Filed: Jun. 1, 2006

(65) Prior Publication Data
US 2007/0070496 A1     Mar. 29, 2007

(30) Foreign Application Priority Data
Sep. 23, 2005  (KR) ...................... 10-2005-0088745

(51) Int. Cl.
*G02B 21/06* (2006.01)
(52) U.S. Cl. ...................... 359/386; 359/370; 359/371; 359/385
(58) Field of Classification Search ................ 359/386, 359/370, 371, 385
See application file for complete search history.

(56) References Cited

U.S. PATENT DOCUMENTS 5,764,363 A * 6/1998 Ooki et al. .................. 356/364
2001/0040723 A1 * 11/2001 Kusaka ....................... 359/370

FOREIGN PATENT DOCUMENTS

JP      03 91709      4/1991

OTHER PUBLICATIONS

Neil et al., Optimized pupil-plane filters for confocal microscope point-spread function engineering, *Optics Letters*, vol. 25, No. 4, Feb. 15, 2000, pp. 245-247.
Kany et al., Enhancement of lateral resolution in confocal self-interference microscopy, *Optics Letters*, vol. 28, No. 24, Dec. 15, 2003, pp. 2470-2472.

* cited by examiner

*Primary Examiner*—Joshua L Pritchett
(74) *Attorney, Agent, or Firm*—Patterson, Thuente, Skaar & Christensen, P.A.

(57) ABSTRACT

The present invention relates to confocal self-interference microscopy. The confocal self-interference microscopy further includes a first polarizer for polarizing reflected or fluorescent light from a specimen, a first birefringence wave plate for separating the light from the first polarizer into two beams along a polarizing direction, a second polarizer for polarizing the two beams from the first birefringence wave plate, a second birefringence wave plate for separating the two beams from the second polarizer into four beams along the polarizing direction, and a third polarizer for polarizing the four beams from the second birefringence wave plate, in the existing confocal microscopy. Optic-axes of the first and second birefringence wave plates exist on the same plane, optic-axes of the first and second birefringence wave plates are inclined from an optical axis of the entire optical system at a predetermined angle, and self-interference spatial periods of the first and second birefringence wave plates are different from each other.

10 Claims, 17 Drawing Sheets

COORDINATE SYSTEM OF OBJECT SURFACE

COORDINATE SYSTEM OF OBJECT SURFACE(nm)

COORDINATE SYSTEM OF OBJECT SURFACE(nm)

US 7,324,273 B2

CONFOCAL SELF-INTERFERENCE MICROSCOPY FROM WHICH SIDE LOBE HAS BEEN REMOVED

BACKGROUND OF THE INVENTION

Related Application

This application claims the benefit of Korean Patent Application No. 10-2005-88745, filed Sep. 23, 2005.

1. Field of the Invention

The present invention relates to a confocal self-interference microscopy from which side lobes have been removed, and more particularly, to a confocal self-interference microscopy in which the distortion of images can be reduced by eliminating side lobes from a point spread function, which occurs in an existing confocal self-interference microscopy.

2. Background of the Related Art

A confocal microscopy is a microscopy in which the pin hole is disposed on a light path from a sample to the image detector through the objective lens. The microscopy can detect beams passing through a specific cross section of the sample and obtain information about a depth of the sample as well as a plane image thereof, thereby enabling a 3-D image to be obtained. The confocal microscopy has been widely used to research structures, such as semiconductor parts, microscopically processed goods and materials, as well as biomedical fields.

The confocal microscopy has many advantages in comparison with an electron microscopy or an atomic force microscopy, which is used to research a microscopic structure. That is, the electron microscopy has drawbacks in that it must keep the vacuum state, it requires a pre-processing procedure of a specimen, it is not appropriate for total inspection, and so on. Furthermore, the atomic force microscopy also has shortcomings in that it may give damage on the surface of the sample, it requires a long test time, it is not appropriate for total inspection, and the like.

In contrast, the confocal microscopy can perform measurement under ordinary temperature atmosphere in a non-contact way and allows for real-time measurement. Accordingly, the confocal microscopy was expected to replace the electron microscopy and the atomic force microscopy.

However, the confocal microscopy has a drawback in that the limit of the resolution is decided by the optical diffraction phenomenon since it fundamentally employs light. The existing optical microscopy was successful in lowering the limit of the resolution, which was several hundreds of nm, to the level of 140 nm (for example, VK-9500 by Keyence Corporation) using the confocal scanning microscopy. However, the existing optical microscopy has not yet obtained the resolution of 100 nm or less. For this reason, the electron microscopy and the atomic force microscopy are used to test semi-conductors, flat panel displays (FPD), and so on.

To overcome the limitation of the confocal microscopy, a confocal self-interference microscopy has been proposed. The confocal self-interference microscopy can generate interference patterns to plane coordinates of a sample with respect to reflected rays, thereby improving lateral the resolution of the microscopy.

FIG. 1 shows the construction of the confocal self-interference microscopy in the related art.

As shown in FIG. 1, the related art confocal self-interference microscopy 500 includes a general confocal microscopy, and a self-interference system 510 having polarizers 511, 512, and a birefringence wave plate 516. The general confocal microscopy includes a light source 20, a beam expander 25, a beam splitter 30, a condenser (a convex lens or a concave mirror) 40, a specimen 45, a telescope optical system 50, a focusing lens 65, a pin-hole aperture 70, and an image detector 75.

A beam of light, which is irradiated from the light source 20, becomes a parallel light in the beam expander 25 and is reflected from the beam splitter 30. The light reflected from the beam splitter 30 is focused on the surface of an object on the specimen 45 through the condenser 40 and is then illuminated.

The light, which has been reflected or become fluorescent from the surface of the object, becomes a parallel light in the condenser 40. The light transmits the bean splitter 30 and is then measured by the image detector 75 through the telescope optical system 50, the self-interference optical system 510, the focusing lens 65, and the pin-hole aperture 70.

FIG. 2 is a conceptual view illustrating an optical path in the self-interference optical system 510 of the confocal self-interference microscopy 500 in the related art.

The self-interference optical system 510 includes two polarizers 511, 512 having polarizing angles which are vertical to each other, and one birefringence wave plate 516 located between the two polarizers 511, 512. The polarizer 511 has a polarizing angle of 45°, which is inclined from a polarizing direction (a horizontal direction (↔) FIG. 2) of a ordianry light or a polarizing direction (a vertical direction (⊙) in FIG. 2) of an extraordianry light so that the light incident from the birefringence wave plate 516 has the ordinary light and the extraordianry light of 1:1.

The light in which the horizontally polarized light (↔) and the vertically polarized light (⊙) become 1:1 through the polarizer 511 is separated into a horizontally polarized light (i.e., the ordianry light) (a dotted line in FIG. 2) and a vertically polarized light (i.e., the extraordianry light) (a solid line in FIG. 2) in the birefringence wave plate 516. The two lights travel along different paths, thus generating the phase difference. The phase difference is varied depending on an incidence angle of light incident on the self-interference optical system 510.

Interference is generated between the ordianry light and the extraordianry light due to the phase difference varied depending on the incidence angle. An optical system employing this interference phenomenon is called a "self-interference optical system".

A Point Spread Function (PSF) of the confocal microscopy using the self-interference optical system is a function in which the point spread function of the general confocal microscopy is multiplied by the interference phenomenon caused by the self-interference optical system.

FIG. 3 illustrates the point spread function (a solid line) in the confocal self-interference microscopy on a specimen 45.

From FIG. 3, it can be seen that the size of a main beam of the confocal self-interference microscopy becomes small and the resolution is improved accordingly because the point spread function (a dotted line) of the general confocal microscopy is multiplied by the interference phenomenon.

FIG. 4a shows the point spread function of the general confocal microscopy. FIG. 4b shows the point spread function of the confocal self-interference microscopy shown in FIG. 1. FIG. 4c shows the point spread function of the confocal self-interference microscopy in which a self-interference system is further disposed vertically to the self-interference optical system 510 of FIG. 1.

From FIGS. 3, and 4a to 4c, it can be seen that the resolution is improved using the confocal self-interference microscopy.

However, the related art confocal self-interference microscopy has the following two problems.

First, the image distortion phenomenon is generated by side lobes.

The point spread function of the confocal self-interference microscopy is represented by the multiplication of the point spread function of the confocal microscopy and the self-interference pattern. To reduce the width of the main beam of the point spread function of the confocal self-interference microscopy, the spatial frequency of the self-interference pattern must be increased (or the spatial period must be reduced). In this case, an amount of side lobes is increased. This phenomenon can be seen from FIG. 5a (an example in which the self-interference phenomenon is generated in one direction) and FIG. 5b (an example in which the self-interference phenomenon is generated in two directions).

FIG. 5a shows an example in which the resolution was improved compared with the confocal self-interference microscopy of FIG. 4b. FIG. 5b shows an example in which the resolution was improved compared with the confocal self-interference microscopy of FIG. 4c. By comparing FIGS. 4a to 4c and FIGS. 5a and 5b, it can be seen that the better the resolution, the greater the side lobes. An image can be obtained by the confocal self-interference microscopy through the convolution of the point spread function of the confocal self-interference microscopy and information about an object. The side lobes of the confocal self-interference microscopy cause the distortion of images.

Second, an interference pattern depending on the difference in an output location between main beams that have passed through the birefringence wave plate is generated.

Output locations of two beams that have been divided through the birefringence wave plate are different from each other as can be seen from FIG. 2. The difference between the locations is changed according to an incidence angle of the beam. An interference pattern is occurred in the beam measurement unit depending on the difference in the output location between the two beams.

SUMMARY OF THE INVENTION

Accordingly, the present invention has been made in view of the above problems occurring in the prior art, and it is an object of the present invention to provide a confocal self-interference microscopy from which side lobes have been eliminated while reducing the size of a main beam, wherein an object having a size of several tens of nm can be observed without distortion by overcoming the limits of the above-mentioned existing confocal self-interference microscopy.

To achieve the above object, a confocal self-interference microscopy according to an aspect of the present invention includes an illumination unit including a light source; a specimen; an image detection unit for measuring an image of the specimen; a beam expanding unit including a convex lens or a concave mirror, for converting illumination beam from the illumination unit into a plane wave; a beam splitter that introduces the illumination beam from the beam expanding unit into the specimen and introduces reflected or fluorescent light from the specimen into the image detection unit; a condenser located between the specimen and the beam splitter, for condensing the illumination beam from the illumination unit through the beam splitter, irradiating the condensed light on the specimen, and converting the reflected or fluorescent light from the specimen into a plane wave, the condenser including a convex lens or a concave mirror; a self-interference optical system located between the beam splitter and the image detection unit, the self-interference optical system including a first polarizer for polarizing the reflected or fluorescent light from the specimen through the condenser and the beam splitter, a first birefringence wave plate for separating the light from the first polarizer into two beams along a polarizing direction, a second polarizer for polarizing the two beams from the first birefringence wave plate, a second birefringence wave plate for separating the two beams from the second polarizer into four beams along the polarizing direction, and a third polarizer for polarizing the four beams from the second birefringence wave plate; an iris located between the self-interference optical system and the image detection unit, for limiting a passage region of the beams that have passed through the self-interference optical system; a focusing lens located between the iris and the image detection unit, for focusing the beams from the iris the focusing lens including a convex lens or a concave mirror; and a pin-hole aperture located on a focal plane of the focusing lens between the focusing lens and the image detection unit. Here, optic-axes of the first and second birefringence wave plates exist on the same plane, optic-axes of the first and second birefringence wave plates are inclined from an optical axis of the entire optical system at a predetermined angle, and self-interference spatial periods of the first and second birefringence wave plates are different from each other.

Furthermore, the self-interference optical system further comprises a third birefringence wave plate for separating the four beams from the third polarizer into eight beams along the polarizing direction, a fourth polarizer for polarizing the eight beams from the third birefringence wave plate, a fourth birefringence wave plate for separating the eight beams from the fourth polarizer into sixteen beams along the polarizing direction, and a fifth polarizer for polarizing the sixteen beams from the fourth birefringence wave plate. Optic-axes of the third and fourth birefringence wave plates exist on the same plane, a plane on which the optic-axes of the third and fourth birefringence wave plates exist is vertical to the optic-axes of the first and second birefringence wave plates, the optic-axes of the third and fourth birefringence wave plates are inclined from the optical axis of the entire optical system at a predetermined angle, and self-interference spatial periods of the third and fourth birefringence wave plates are different from each other.

Furthermore, the polarizing directions of the first, third, and fifth polarizers may be inclined from the optic-axes of the first and second birefringence wave plates at an angle of 45 degrees, and the polarizing directions of the second and fourth polarizers may be vertical to the polarizing directions of the first, second, and third polarizers.

Furthermore, the self-interference spatial period of the first birefringence wave plate may be the same as the self-interference spatial period of the third birefringence wave plate, and the self-interference spatial period of the second birefringence wave plate may be the same as the self-interference spatial period of the fourth birefringence wave plate.

The above-mentioned confocal self-interference microscopy according to an embodiment of the present invention may further include a telescope optical system located between the beam splitter and the first polarizer, for extending a path of the reflected or fluorescent light, wherein the telescope optical system includes two convex lens or concave mirrors.

Furthermore, the above-mentioned confocal self-interference microscopy according to an embodiment of the present invention may further include a beam deflection unit located between the beam splitter and the condenser, for changing a progress angle of the illumination beam, wherein the beam deflection unit includes a Galvanometer.

Furthermore, the above-mentioned confocal self-interference microscopy according to an embodiment of the present invention may further include a relay optical system located between the third or fifth polarizer and the iris, for re-focusing the beam from the third or fifth polarizer on the iris, wherein the relay optical system includes two convex lens or concave mirrors.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

The present invention will now be described in detail in connection with specific embodiments with reference to the accompanying drawings.

First Embodiment

Figure 6:
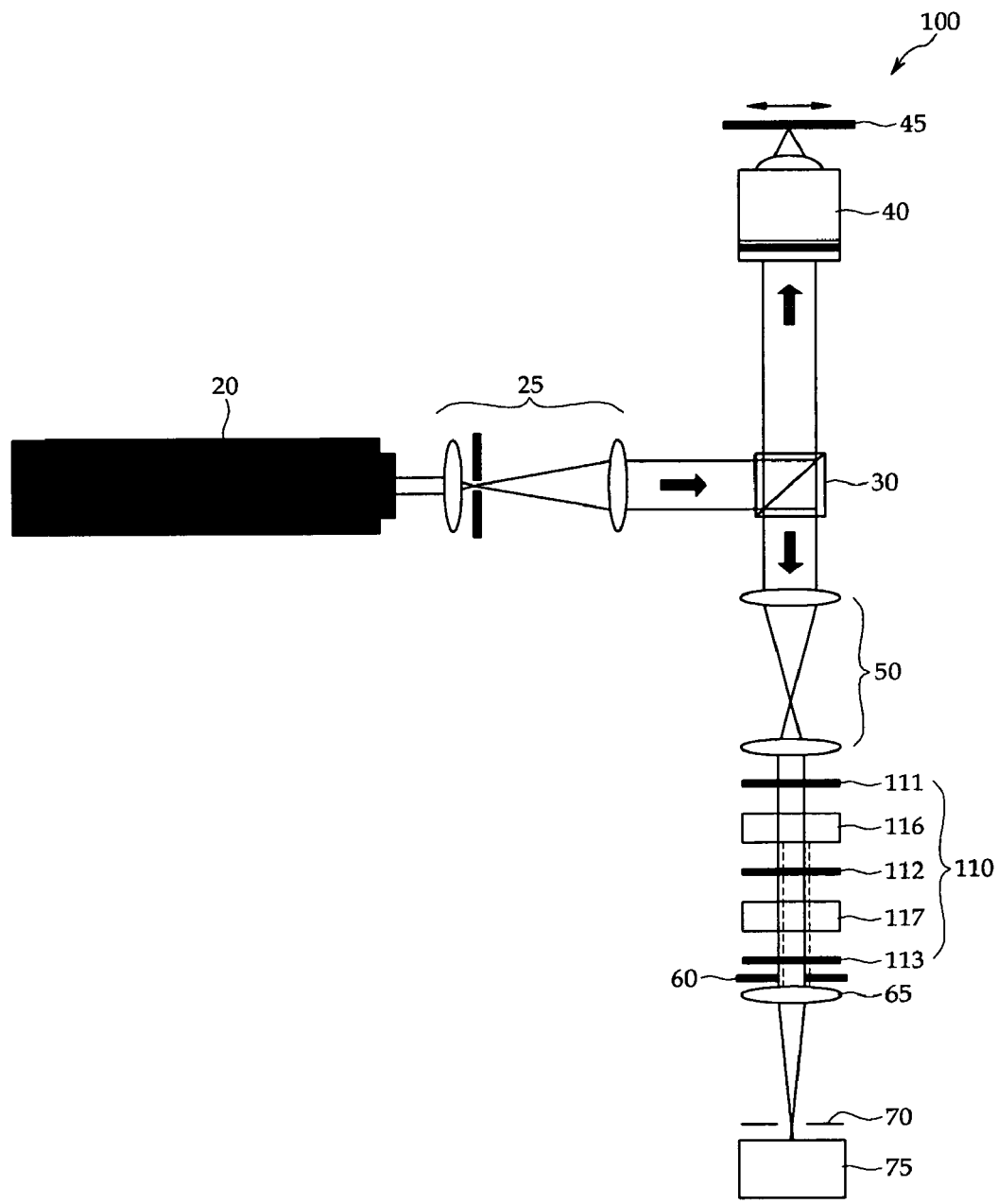
FIG. 6 shows the construction of a confocal self-interference microscopy according to a first embodiment of the present invention.

FIG. 6 shows the construction of a confocal self-interference microscopy 100 according to a first embodiment of the present invention.

As shown in FIG. 6, the confocal self-interference microscopy 100 according to the first embodiment of the present invention includes an illumination unit 20, a beam expander 25, a beam splitter 30, a condenser 40, a specimen 45, a telescope optical system 50, an iris 60, a focusing lens 65, a pin-hole aperture 70, an image detector 75, and a self-interference optical system 110. The self-interference optical system 110 includes polarizers 111, 112, and 113, and birefringence wave plates 116, 117.

The illumination unit 20 includes a light source for illuminating the specimen 45. The light source may include a common lighting that emits light having a variety of wavelengths, a laser that emits light having a specific wavelength, or the like.

The beam expander 25 serves to convert a circular wave, which is irradiated from a point light source of the illumination unit 20, into a plane wave. A convex lens or a concave mirror may be used as the beam expander 25.

The illumination beam, which has been converted into the plane wave in the beam expander 25, proceeds to the beam splitter 30. The beam splitter 30 serves to transmit a portion of incident light and to reflect the remaining of the incident light. A cubic beam splitter, a semi-plating beam splitter, a dichroic beam splitter or the like may be used as the beam splitter 30.

The portion of the illumination beam, which has been incident on the beam splitter 30, is transmitted and the remaining of the illumination beam is reflected. The incident illumination beam is separated into two beams. One of the two beams proceeds in order to illuminate the specimen 45.

The illumination beam that has been reflected by the beam splitter 30 proceeds to the condenser 40. The condenser 40 causes the parallel wave, which has been incident on the condenser 40, to be focused on the specimen 45. A convex lens or a concave mirror may be used as the condenser 40. Furthermore, the condenser 40 is also used to convert reflected or fluorescent light from the specimen 45 into a plane wave.

The illumination beam is focused on the specimen 45 by means of the condenser 40 and illuminates the specimen 45. If being illuminated with illumination beam, the specimen 45 may reflect the illumination beam or emit (become fluorescent) light of a frequency lower than that of the illumination beam.

The reflected or fluorescent light from the specimen 45 is converted into a plane wave in the condenser 40 and is then split into two beams in the beam splitter 30. One of the two beams proceeds to the illumination unit 20 again and the other of the two beams proceeds toward the image detector 75.

The reflected/fluorescent light that proceeds toward the image detector 75 may pass through the telescope optical system 50. The telescope optical system 50 includes two convex lens or concave mirrors. The telescope optical system 50 is used to extend a proceeding light path and enlarge or reduce the cross section of a proceeding beam. The telescope optical system 50 may be selectively added, if appropriate.

The beam that has passed through the telescope optical system 50 proceeds to the self-interference optical system 110. The self-interference optical system 110 includes the first, second, and third polarizers 111, 112, and 113, and the first and second birefringence wave plates 116, 117. A detailed structure of the self-interference optical system 110 is shown in FIG. 7.

Figure 7:
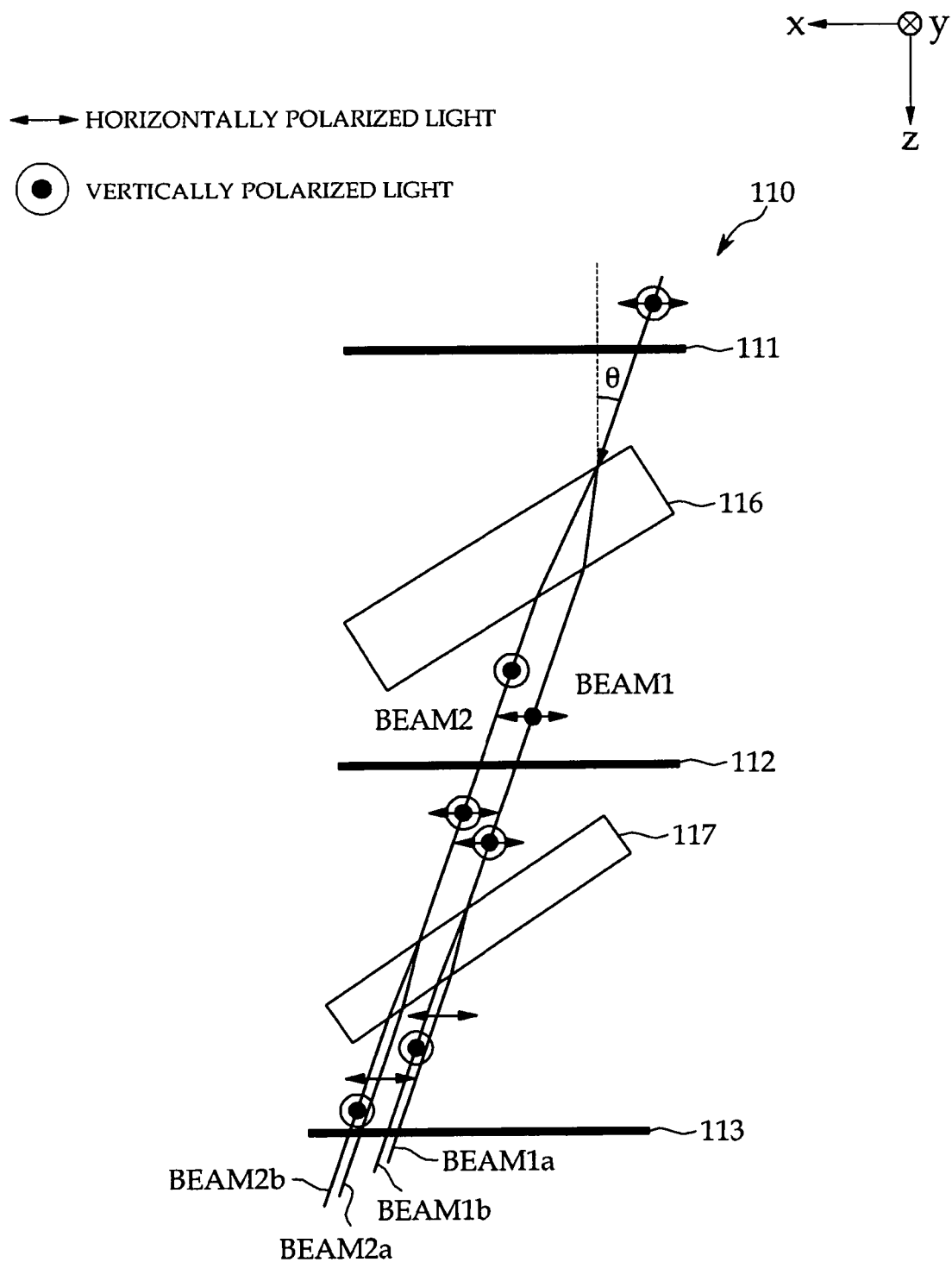
FIG. 7 is a conceptual view illustrating an optical path in a self-interference optical system of the confocal self-interference microscopy according to the first embodiment of the present invention.

As shown in FIG. 7, the progress direction of the beam is indicated by the z axis. A plane vertical to the progress direction of the beam is indicated by the x-y plane. In the first embodiment, the optic-axes of the birefringence wave plates 116, 117 are on the same plane. The plane is indicated by the x-z plane in FIG. 7.

However, since the birefringence wave plates 116 and 117 may have a different degree of rotation along the y axis or have a different thickness, they have different spatial periods of interference patterns depending on variation in an incidence angle. Alternatively, the birefringence wave plates 116 and 117 having different birefringence constants may be used.

The polarizers 111, 112 and 113 are located on the x-y plane and have a polarizing direction inclined from the x axis by an angle. The polarizing direction may be preferably inclined from the x axis by an angle of 45 degrees so that the horizontally polarized light (↔ in FIG. 7) and the vertically polarized light (⊙ in FIG. 7) are incident on the birefringence wave plates 116 and 117 in 1:1 relationship.

Hereinafter, the first embodiment will be described assuming that the first and third polarizers 111 and 113 are inclined from the x axis by an angle of +45 degrees and the second polarizer 112 is inclined from the x axis by an angle of −45 degrees.

A beam whose incident angle is "θ" (an angle inclined from the z axis is θ) while being on the x-z plane will be described below. The beam passes through the first polarizer 111 and then proceeds as polarized light whose polarizing angle is inclined from the x axis by an angle of +45 degrees (horizontally polarized light and vertically polarized light is 1:1). The beam passes through the first birefringence wave plate 116. The horizontally polarized light and the vertically polarized light travel along different paths, thus generating the phase difference between the two beams.

The phase difference is proportional to the incidence angle (θ). Assuming a proportional constant is a "birefringence wave plate constant ($c_1$)", an electric field of the horizontally polarized light (i.e., ordinary light) (beam1) is "$E_1$", and an electric field of the vertically polarized light (i.e., extraordianry light) (beam2) is "$E_2$", the following equation 1 may be satisfied.

$$E_1 = E_0$$

$$E_2 = E_0 \exp(ic_1\theta) \quad \text{[Equation 1]}$$

The two beams (beam1 and beam2) pass through the second polarizer 112 and are inclined from the x axis by an angle of −45 degrees, so that the vertically polarized light and the horizontally polarized light become the same state. The two beams (beam1 and beam2) proceed to the second birefringence wave plate 117 having a birefringence wave plate constant of "$c_2$". The beam (beam1) is split into two beams (beam1$a$ and beam1$b$) and the beam (beam2) is split into two beams (beam2$a$ and beam2$b$). At this time, an electric field of each beam can be expressed in the following equation 2.

$$E_{1a} = E_0$$

$$E_{1b} = E_0 \exp(ic_2\theta)$$

$$E_{2a} = E_0 \exp(ic_1\theta)$$

$$E_{2b} = E_0 \exp(ic_1\theta)\exp(ic_2\theta) \quad \text{[Equation 2]}$$

These beams (beam1$a$, beam1$b$, beam2$a$, and beam2$b$) pass through the third polarizer 113 and a total of electric fields that is finally obtained can be expressed in the following equation 3.

$$\begin{aligned} E_{tot} &= E_{1a} + E_{1b} + E_{2a} + E_{2b} \quad \text{[Equation 3]} \\ &= E_0[1 + \exp(ic_1\theta)][1 + \exp(ic_2\theta)] \\ &= E_0 \cos\left(\frac{c_1\theta}{2}\right)\exp\left(\frac{ic_1\theta}{2}\right)\cos\left(\frac{c_2\theta}{2}\right)\exp\left(\frac{ic_2\theta}{2}\right) \end{aligned}$$

In Equation 3, $E_0(\theta)$ denotes the distribution of an electric field in a general confocal microscopy. For example, in the case where a filled circular beam proceeds, $E_0(\theta)$ may have a shape proportional to the first order Bessel function ($J_1(\alpha\theta)$, where $\alpha$ is a constant). The term $$\cos\left(\frac{c_1\theta}{2}\right)\exp\left(\frac{ic_1\theta}{2}\right)$$

denotes the effect of interference caused by the first birefringence wave plate 116.

In other words, the term $$E_0\left(\frac{c_1\theta}{2}\right)\exp\left(\frac{ic_1\theta}{2}\right)$$

denotes the distribution of the electric field of the relate art confocal self-interference microscopy using one birefringence wave plate. The term $$\cos\left(\frac{c_2\theta}{2}\right)\exp\left(\frac{ic_2\theta}{2}\right)$$

denotes the effect of interference caused by the second birefringence wave plate 117.

As a result, the electric field of Equation 3 is a value in which the electric field of the general confocal microscopy is multiplied by the interferences caused by the first birefringence wave plate 116 and the second birefringence wave plate 117.

In Equation 3, only the effect relative to the incidence angle in the x-z plane has been described. In the y-z plane of the self-interference optical system 110, the birefringence wave plates 116 and 117 of the self-interference optical system 110 do not have an effect on the incidence angle (θ').

Therefore, when the incidence angle in the x-axis direction of the incident light is θ and the incidence angle in the y-axis direction of the incident light is θ', an electric field of a beam that has passed through the self-interference optical system 110 can be expressed in the following equation 4.

$$E_{tot}(\theta, \theta') = E_0(\theta, \theta') \cos\left(\frac{c_1\theta}{2}\right) \exp\left(\frac{ic_1\theta}{2}\right) \cos\left(\frac{c_2\theta}{2}\right) \exp\left(\frac{ic_2\theta}{2}\right) \quad \text{[Equation 4]}$$

From the electric field ($E_{tot}$) of Equation 4, the point spread function of the confocal self-interference microscopy according to the first embodiment of the present invention can be expressed in the following equation 5.

$$I(\theta,\theta') ] |E_{tot}(\theta,\theta')|^2 \quad \text{[Equation 5]}$$

The two self-interference phenomena generated as above may be used to eliminate side lobes occurring in the point spread function.

Figure 8A:
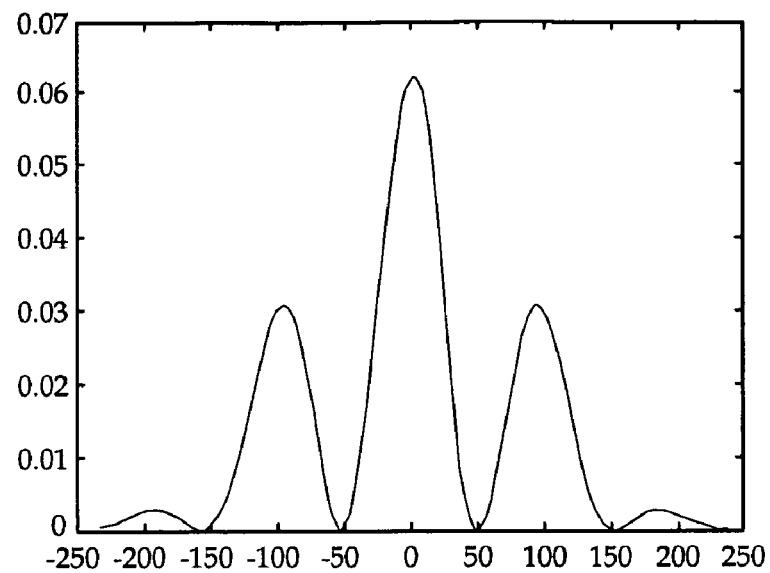
FIG. 8a is a cross-sectional view of the point spread function of the existing confocal self-interference microscopy and FIG. 8b is a cross-sectional view of the point spread function of the confocal self-interference microscopy according to the first embodiment of the present invention.
Figure 8B:
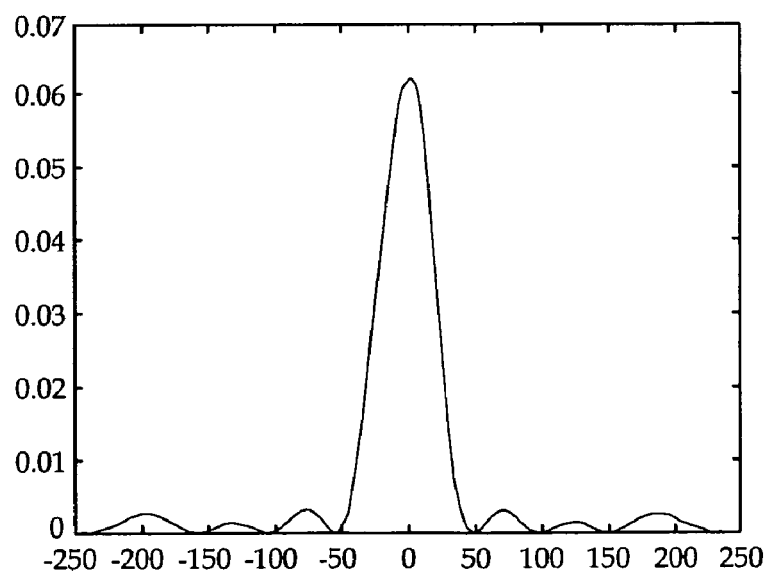

FIGS. 8a and 8b are graphs showing the effects of removing the side lobes. In FIGS. 8a and 8b, the traverse axis indicates the incidence angle (θ), which has been converted into the length on the specimen 45. The longitudinal axis indicates the intensity of light.

Figure 1:
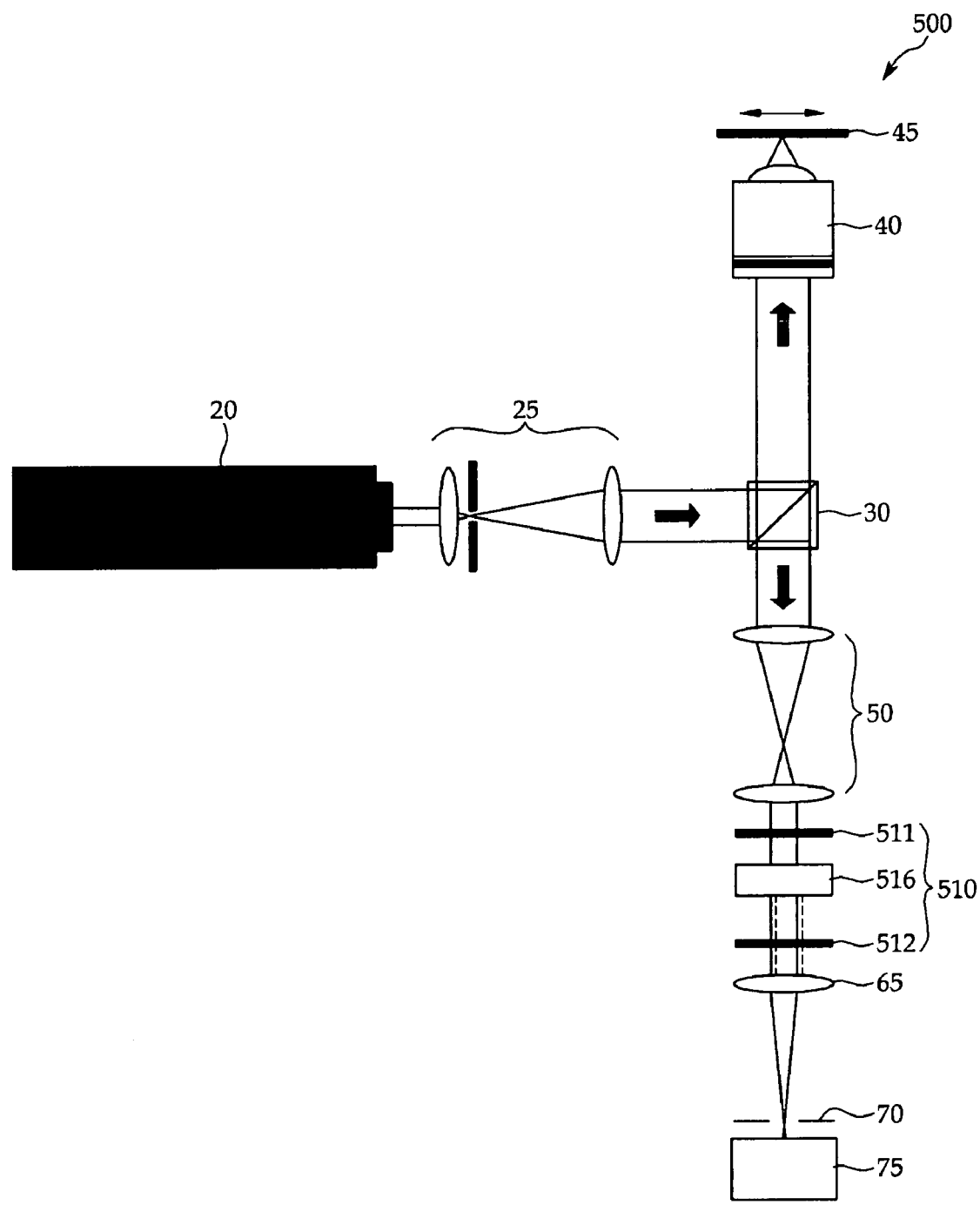
FIG. 1 shows the construction of a confocal self-interference microscopy in the related art.
Figure 2:
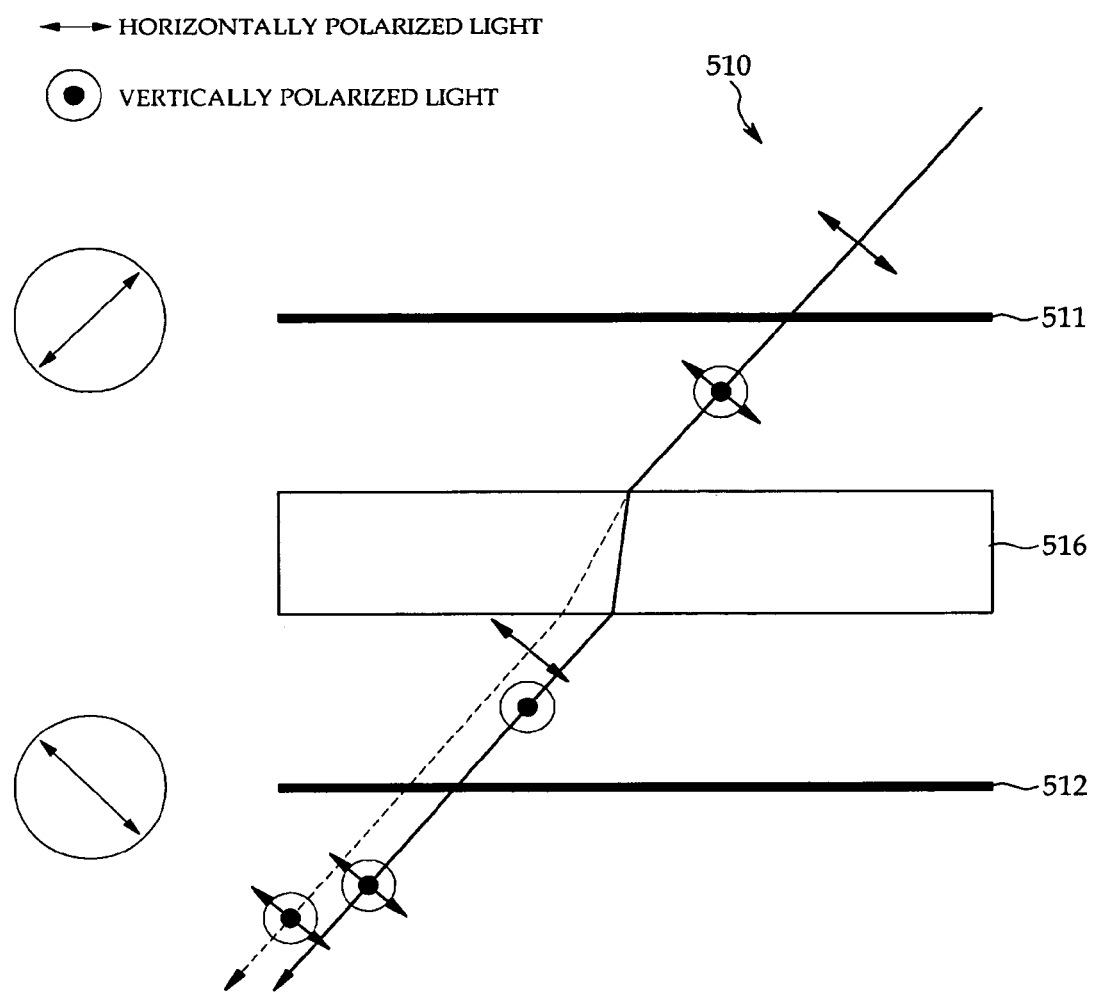
FIG. 2 is a conceptual view illustrating an optical path in a self-interference optical system of the confocal self-interference microscopy in the related art.
Figure 3:
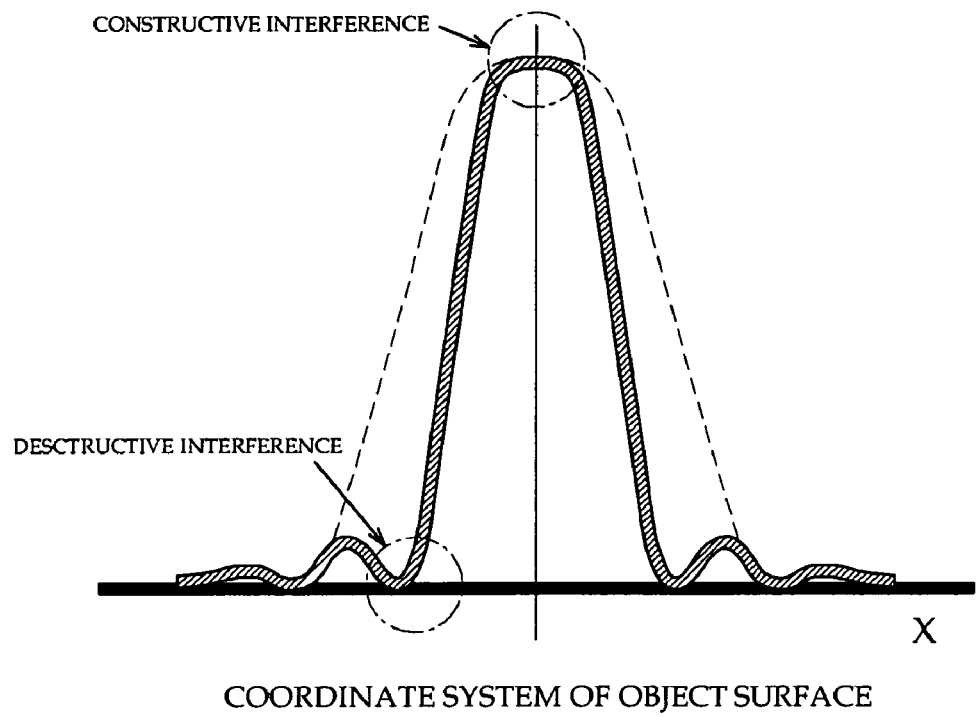
FIG. 3 is a conceptual view illustrating the point spread function (PSF) in the confocal self-interference microscopy in the related art.
Figure 4A:
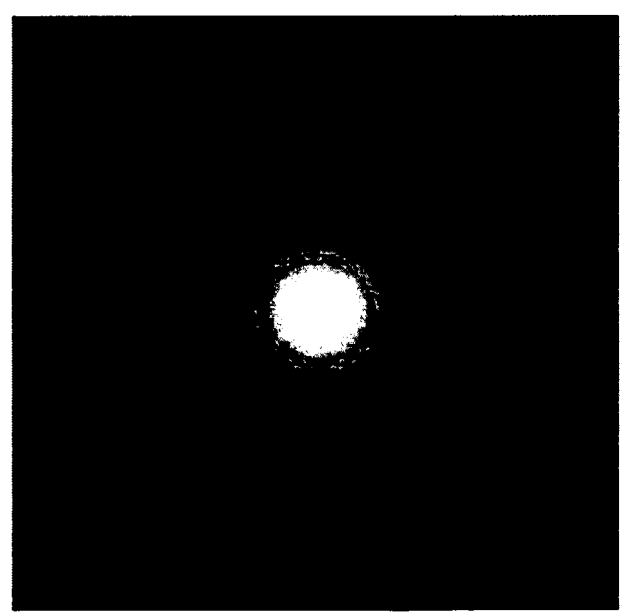
FIG. 4a illustrates the distribution of the point spread function in a general confocal microscopy.
Figure 4B:
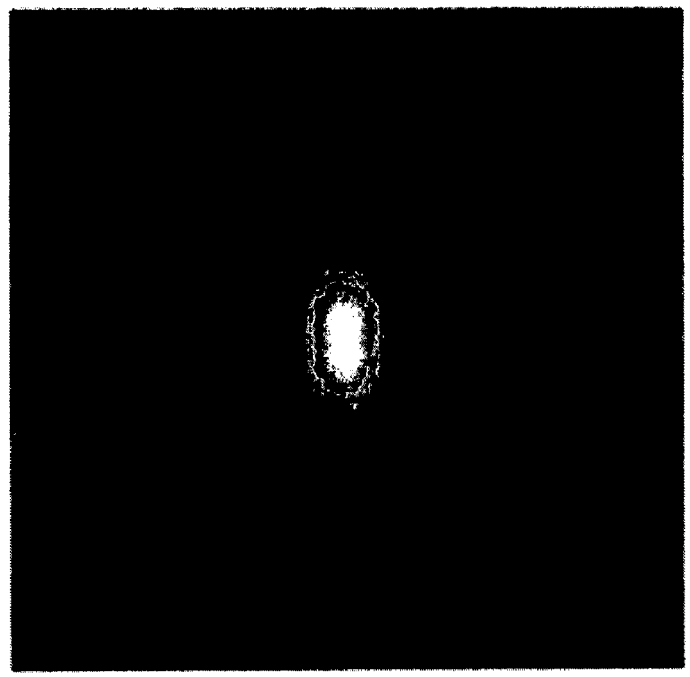
FIG. 4b illustrates the distribution of the point spread function in an existing confocal self-interference microscopy employing 1-axis self-interference.
Figure 4C:
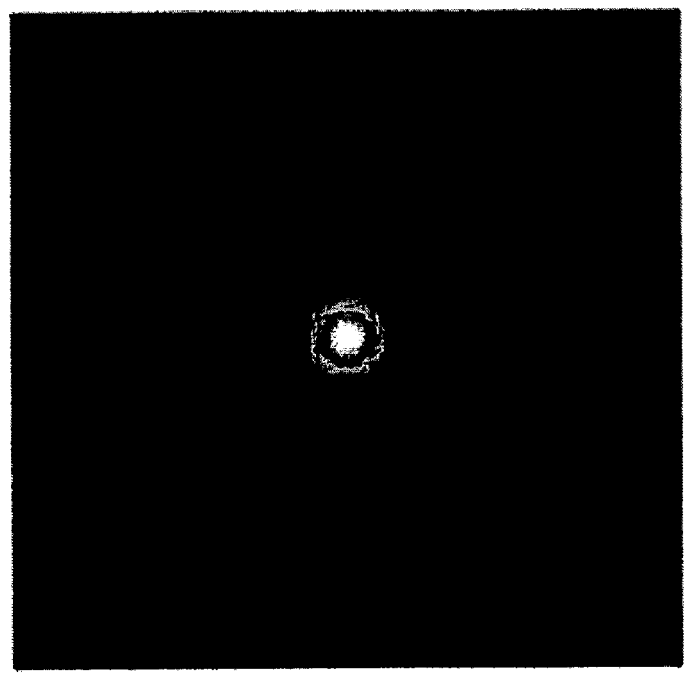
FIG. 4c illustrates the distribution of the point spread function in an existing confocal self-interference microscopy employing 2-axis self-interference.
Figure 5A:
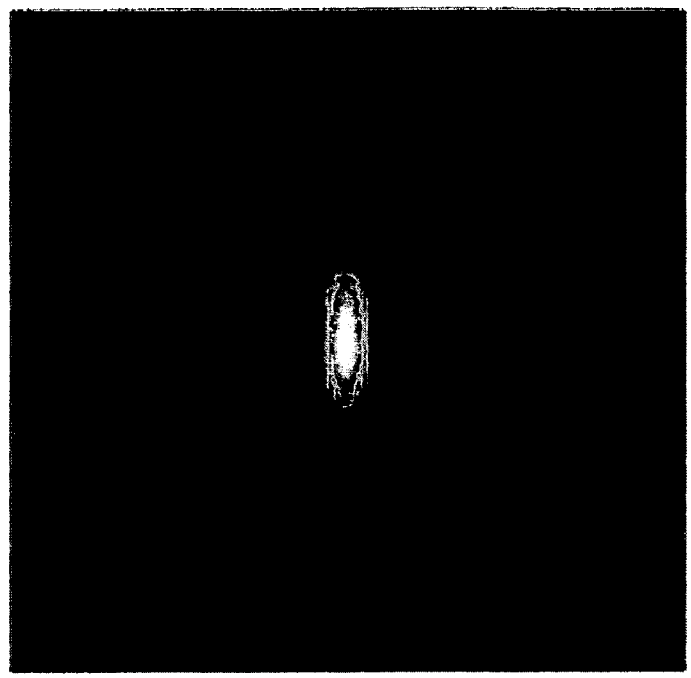
FIGS. 5a and 5b illustrate the distributions of the point spread functions in the existing confocal self-interference microscopy employing 1-axis self-interference and the existing confocal self-interference microscopy employing 2-axis self-interference, respectively, when a self-interference frequency is higher than that of the confocal self-interference microscopy shown in FIGS. 4b to 4c.

FIG. 8a shows an example in which an interference spatial period is 100 nm in the related art confocal self-interference microscopy having only one interference (refer to FIG. 5a). From FIG. 8a, it can be seen that the width (the resolution) of the main beam (center is 0 nm) has the size of several tens of nm, but side lobes are significantly developed at both sides (±100 nm) of the main beam. The related art confocal self-interference microscopy cannot have the resolution of 100 nm or less due to the great side lobes.

FIG. 8b shows an example in which interference spatial periods are 100 nm and 200 nm, respectively, in the confocal self-interference microscopy according to the first embodiment of the present invention. From FIG. 8b, it can be seen that constructive interference is generated at the center (0 nm) of the main beam due to the second interference of the spatial period 200 nm, so that the intensity of light is not reduced, and destructive interference is generated at the center (±100 nm) of side lobes, so that the intensity of light is reduced.

As can be seen from FIG. 8b, to remove the side lobes occurring in the first birefringence wave plate, it is required that the birefringence constant of the second birefringence wave plate become ½ of the birefringence constant of the first birefringence wave plate and the interference spatial period of the second birefringence wave plate is twice the interference spatial period of the first birefringence wave plate.

As described above, the confocal self-interference microscopy according to an embodiment of the present invention can observe an object with the resolution of several tens of nm while reducing the distortion of images due to side lobes.

The beam that has passed through the self-interference optical system 110 passes through the iris 60. In the case where the incidence angle (θ) is very high while the beam passes through the self-interference optical system 110, the beam is separated into two beams in the x-axis direction and may generate the interference pattern due to the difference in the path.

In this case, the iris 60 serves to limit the passage of a beam having a high incidence angle. If the aperture surface of the iris 60 becomes narrow, an improved image can be observed because the interference pattern is reduced. However, there is a disadvantage in that the quantity of light proceeding to the image detector 75 reduces. It is therefore necessary to properly control the aperture of the iris 60.

The beam that has passed through the iris 60 proceeds to the focusing lens 65 including the convex lens or the concave mirror. The focusing lens 65 focuses the incident parallel wave on the pin-hole aperture 70.

The pin-hole aperture 70 allows only beams that have been focused on the narrow aperture surface to pass it through. The location of the focus is changed depending on the depth of the z-axis direction of the specimen 45. Therefore, the beam that has passed through the pin-hole aperture 70 is a beam that has been reflected/become fluorescent at a place having the same depth as that of the specimen 45. If the pin-hole aperture 70 is moved along the z axis, a 3-D image of the specimen can be obtained.

Finally, the image detector 75 detects the reflected/fluorescent image of the specimen 45. A photoelectric detector, a CCD, and so on may be used as the image detector 75.

Second Embodiment

Figure 9:
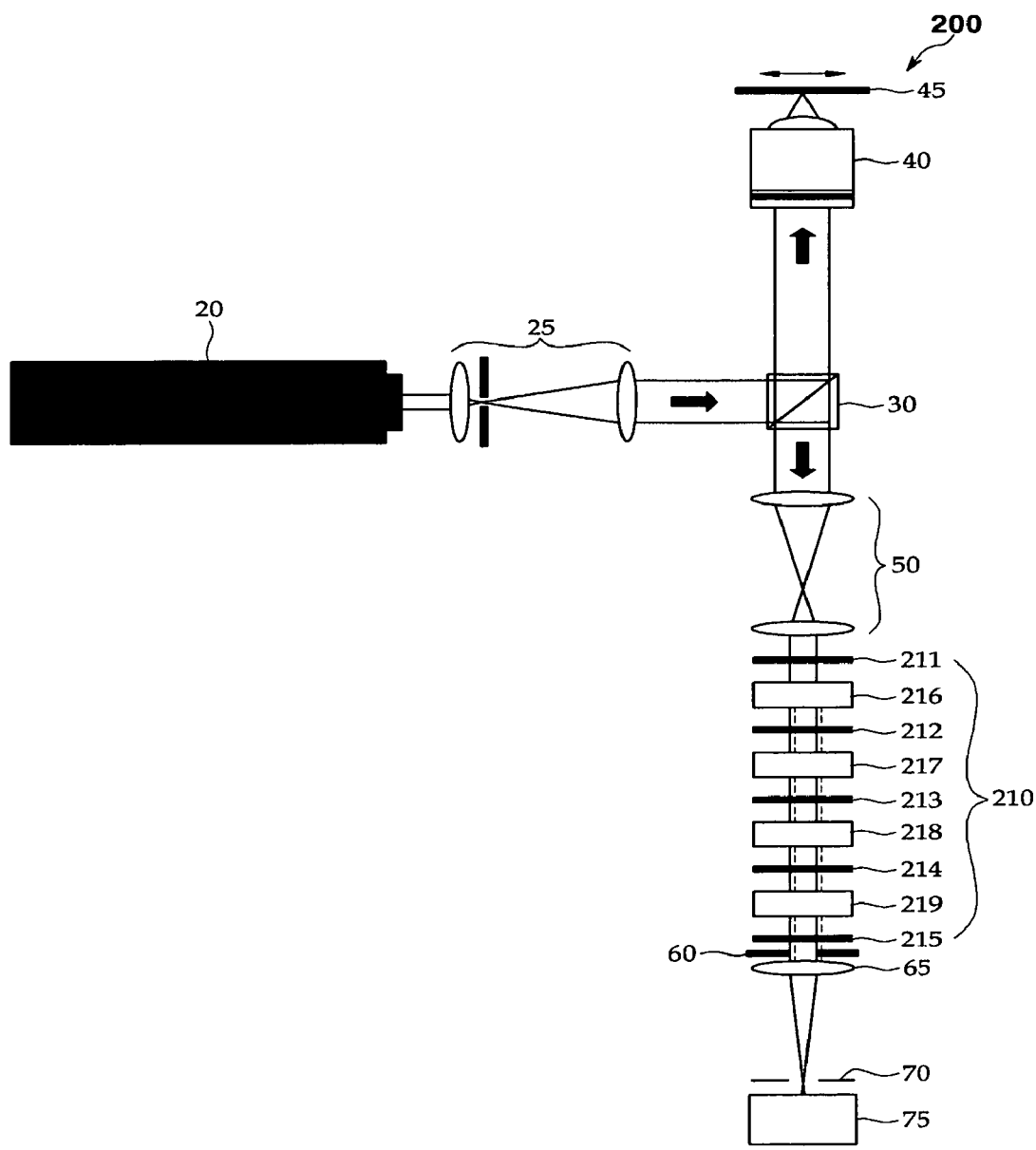
FIG. 9 shows the construction of a confocal self-interference microscopy according to a second embodiment of the present invention.

FIG. 9 shows the construction of a confocal self-interference microscopy 200 according to a second embodiment of the present invention.

As shown in FIG. 9, the confocal self-interference microscopy 200 according to the second embodiment of the present invention includes an illumination unit 20, a beam expander 25, a beam splitter 30, a condenser 40, a specimen 45, a telescope optical system 50, an iris 60, a focusing lens 65, a pin-hole aperture 70, an image detector 75, and a self-interference optical system 210. The self-interference optical system 210 includes polarizers 211, 212, 213, 214 and 215, and birefringence wave plates 216, 217, 218 and 219.

The confocal self-interference microscopy 200 according to the present embodiment is the same as the confocal self-interference microscopy 100 of FIG. 6 according to the first embodiment except for the self-interference optical system 210. Description on the redundant constituent elements compared with the first embodiment will be omitted and only the self-interference optical system 210 will be described below in detail.

The first and second birefringence wave plates 216 and 217, and the first, second and third polarizers 211, 212 and 213 of the self-interference optical system 210 are the same as the first and second birefringence wave plates 116 and 117, and the first, second, and third polarizers 111, 112 and 113 of the self-interference optical system 110 according to the first embodiment.

In other words, the optic-axes of the first and second birefringence wave plates 116 and 117 are in the xz plane. Polarizing directions of the first and third polarizers 111, 113 are inclined from the x axis by an angle of +45 degrees. A polarizing direction of the second polarizer 112 is inclined from the x axis by an angle of −45 degrees.

Therefore, beams, which are incident on the self-interference optical system from the z axis to the x-axis direction at the incidence angle (θ) and from the z-axis to the y-axis direction at the incidence angle (θ'), are not influenced in the y-axis direction in the third polarizer 113, but are respectively split into four beams (refer to FIG. 7) in the x-axis direction. An electric field of each beam can be expressed in Equation 2.

Optic-axes of the third and fourth birefringence wave plates 218, 219 of the self-interference optical system 210 are vertical to those of the first and second birefringence wave plates 216, 217, i.e., in the yz plane. A polarizing direction of the fourth polarizer 214 is inclined from the x axis by an angle of −45 degrees in the same as the polarizing direction of the second polarizer 212. A polarizing direction of the fifth polarizer 215 is inclined from the x axis by an angle of +45 degrees in the same manner as the polarizing directions of the first and third polarizers 211, 213.

Beams that have passed through the third polarizer 213 proceed to the third birefringence wave plate 218 at the incidence angles (θ,θ') in the x axis and y-axis directions, respectively. Since the optic-axis of the third birefringence wave plate 218 is in the yz plane, each beam that has been incident on the third birefringence wave plate 218 is split into two paths in the y-axis direction, but is not influenced in the x-axis direction.

The two split beams pass through the fourth polarizer 214 and have the same polarizing direction. The two beams then proceed to the fourth birefringence wave plate 219. Since the optic-axis of the fourth birefringence wave plate 219 is also in the yz plane, each beam that has been incident on the fourth birefringence wave plate 219 is split into two paths in the y-axis direction, but is not affected in the x-axis direction.

The two split beams pass through the fifth polarizer 215 and have the same polarizing direction accordingly. As described above, each beam that has passed through the third polarizer 213 is split into four beams in the y-axis direction.

As a result, the beams that have been incident on the self-interference optical system 210 at the incidence angles (θ,θ') are split into four beams in the x-axis direction and four beams in the y-axis direction, sixteen beams in total.

Assuming that a birefringence constant of the third birefringence wave plate 218 is "$c_3$" and a birefringence constant of the fourth birefringence wave plate 219 is "$c_4$", a total electric field of beams that has passed through the self-interference optical system 210 can be expressed in the following equation 6.

$$E_{tot}(\theta, \theta') = \quad \text{[Equation 6]}$$
$$E_0(\theta, \theta')\cos\left(\frac{c_1\theta}{2}\right)\exp\left(\frac{ic_1\theta}{2}\right)\cos\left(\frac{c_2\theta}{2}\right)\exp\left(\frac{ic_2\theta}{2}\right) \times$$
$$\cos\left(\frac{c_3\theta'}{2}\right)\exp\left(\frac{ic_3\theta'}{2}\right)\cos\left(\frac{c_4\theta'}{2}\right)\exp\left(\frac{ic_4\theta'}{2}\right)$$

From Equation 6, it can be seen that side lobes can be removed and the resolution can be improved both in the x axis and the y axis through self-interference both in the x-axis and y-axis directions in the self-interference optical system 210 of the second embodiment, in comparison with the self-interference optical system 110 of the first embodiment in which side lobes can be removed and the resolution can be improved only in the x axis through self-interference only in the x-axis direction.

It is preferred that the resolution be the same in the x axis and the y axis. Therefore, it is preferred that the birefringence constant ($c_1$) of the first birefringence wave plate 216 and the birefringence constant ($c_3$) of the third birefringence wave plate 218 be the same and the birefringence constant ($c_2$) of the second birefringence wave plate 217 and the birefringence constant ($c_4$) of the fourth birefringence wave plate 219 be the same.

Furthermore, as mentioned above regarding the first embodiment, the birefringence constants ($c_2$ and $c_4$) of the second and fourth birefringence wave plates 217 and 219 become half the birefringence constants ($c_1$ and $c_3$) of the first and third birefringence wave plates 216 and 218. It is therefore preferred that the interference spatial periods of the second and fourth birefringence wave plates 217 and 219 become twice the interference spatial periods of the first and third birefringence wave plates 216 and 218.

The self-interference phenomenon may be used to remove side lobes occurring in the point spread function.

Figure 10A:
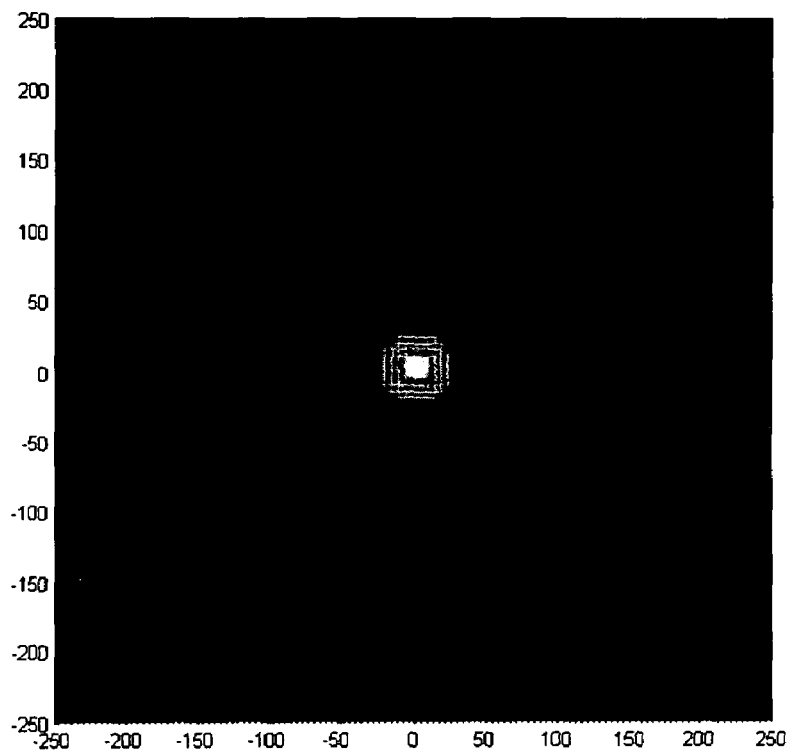
FIG. 10a illustrates the distribution of the point spread function of an existing confocal self-interference microscopy.
Figure 10B:
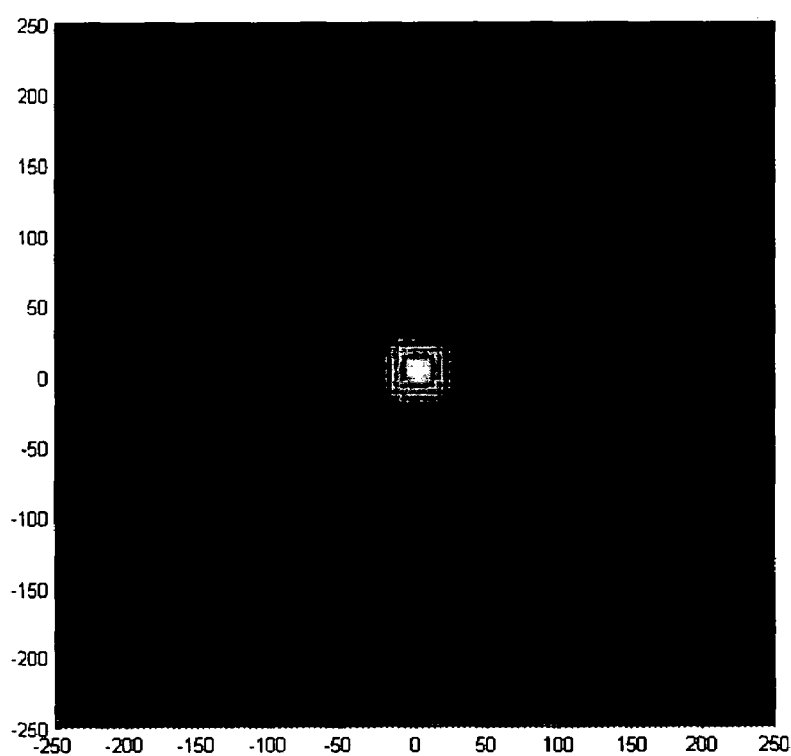
FIG. 10b illustrates the distribution of the point spread function of the confocal self-interference microscopy according to the second embodiment of the present invention.

FIGS. 10a and 10b illustrate the distribution of the point spread function of the confocal self-interference microscopy according to the second embodiment of the present invention.

Figure 5B:
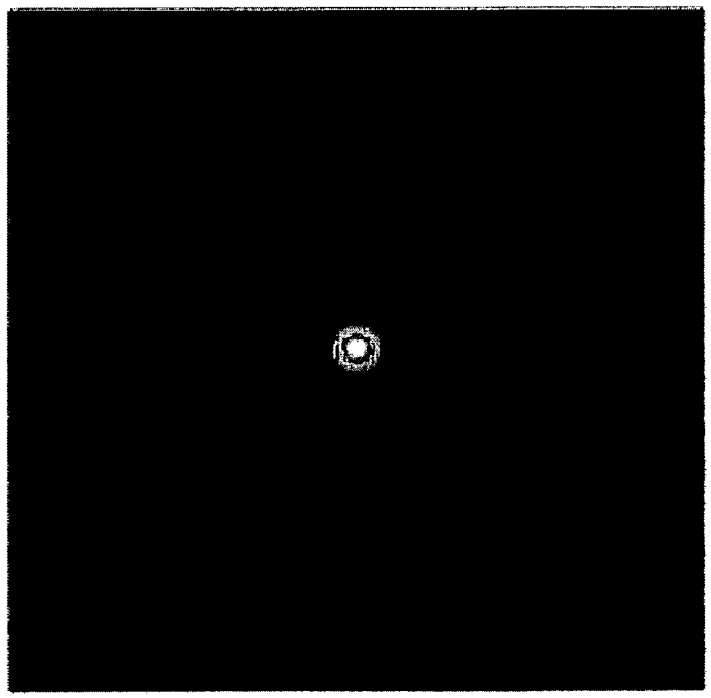

FIG. 10a shows the distribution of the point spread function of the exiting confocal self-interference microscopy (refer to FIG. 5b). From FIG. 10a, it can be seen that the birefringence interference spatial period is 100 nm both in the x-axis direction and the y-axis direction and side lobes are developed from the main beam (x=0, y=0) to the x-axis direction, the y-axis direction, and the diagonal direction.

FIG. 10b shows the distribution of the point spread function of the confocal self-interference microscopy according to the second embodiment of the present invention. From FIG. 10b, it can be seen that the birefringence interference spatial periods are 100 nm and 200 nm both in the x-axis direction and the y-axis direction. It can also be seen that side lobes are significantly reduced in the point spread function of FIG. 10b in comparison with the point spread function of FIG. 10a.

The confocal self-interference microscopy of the first embodiment is a 1-axis confocal self-interference microscopy, which is advantageous in that it can improve the resolution and can remove side lobes only in the x-axis direction, but has the same the resolution as the general confocal microscopy in the y-axis direction.

In contrast, the confocal self-interference microscopy of the second embodiment is advantageous in that it can improve the resolution and can remove side lobes both in the x axis and y axis directions.

FIGS. 11a to 11c and FIGS. 12a to 12c illustrate that an image of an object that is observed is improved by means of the confocal self-interference microscopy according to the second embodiment of the present invention.

Figure 11A:
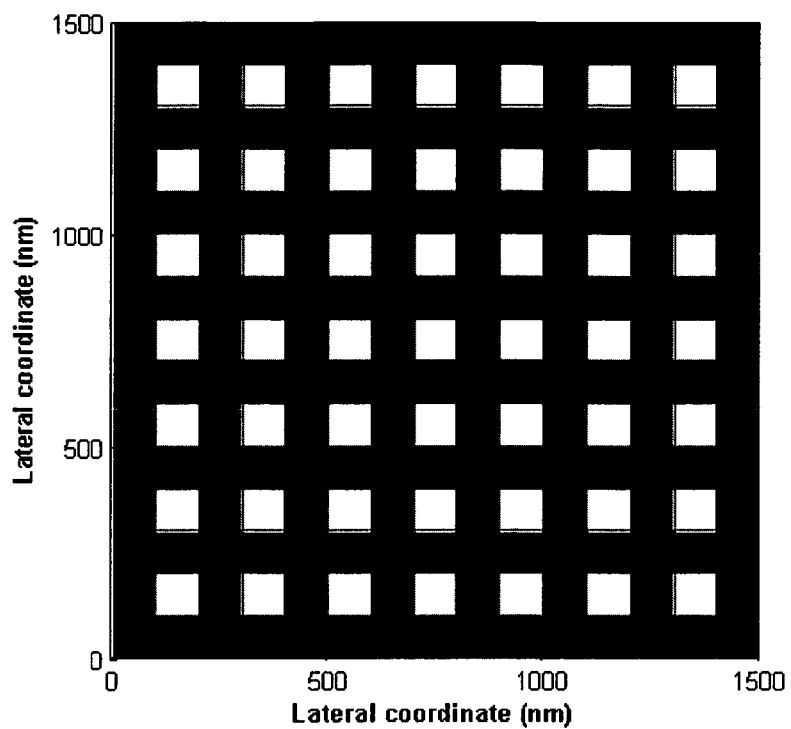
FIG. 11a is a plane view showing an image of an object having a spatial period of 200 nm and a line width of 100 nm.

FIG. 11a shows an image of an object having a spatial period of 200 nm and a line width of 100 nm. The confocal self-interference microscopy that has been used now does not have the resolution of 100 nm or less under the influence of side lobes. Accordingly, the image of the object shown in FIG. 11a would not be discriminated.

Figure 11B:
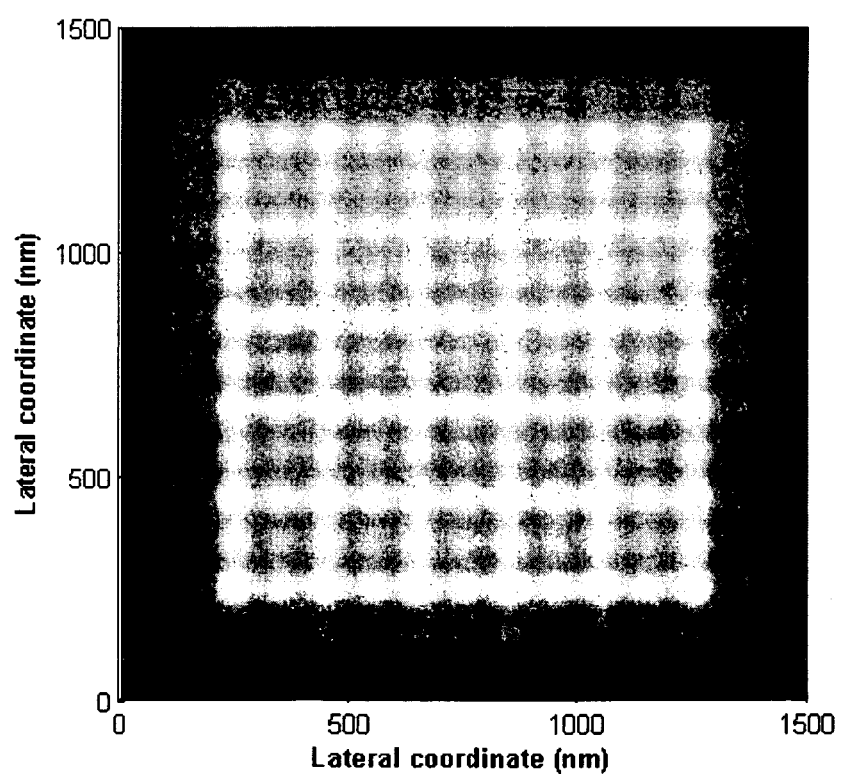
FIG. 11b is a plane view showing an image of the object, which was observed using an existing confocal self-interference microscopy.

FIG. 11b shows the results of observing the object of FIG. 11a using the confocal self-interference microscopy of the related art method, which has the resolution of 100 nm or less despite the influence of side lobes. At this time, an image will be obtained as an image in which the point spread function of the confocal self-interference microscopy of the related art method is convoluted in the image of the object shown in FIG. 11a.

The confocal self-interference microscopy has the resolution capable of discriminating the structure of FIG. 11a, but cannot discriminate the image of the object shown in FIG. 11a due to the problem, such as side lobe of the point spread function inherent in the confocal self-interference microscopy of the related art method.

Figure 11C:
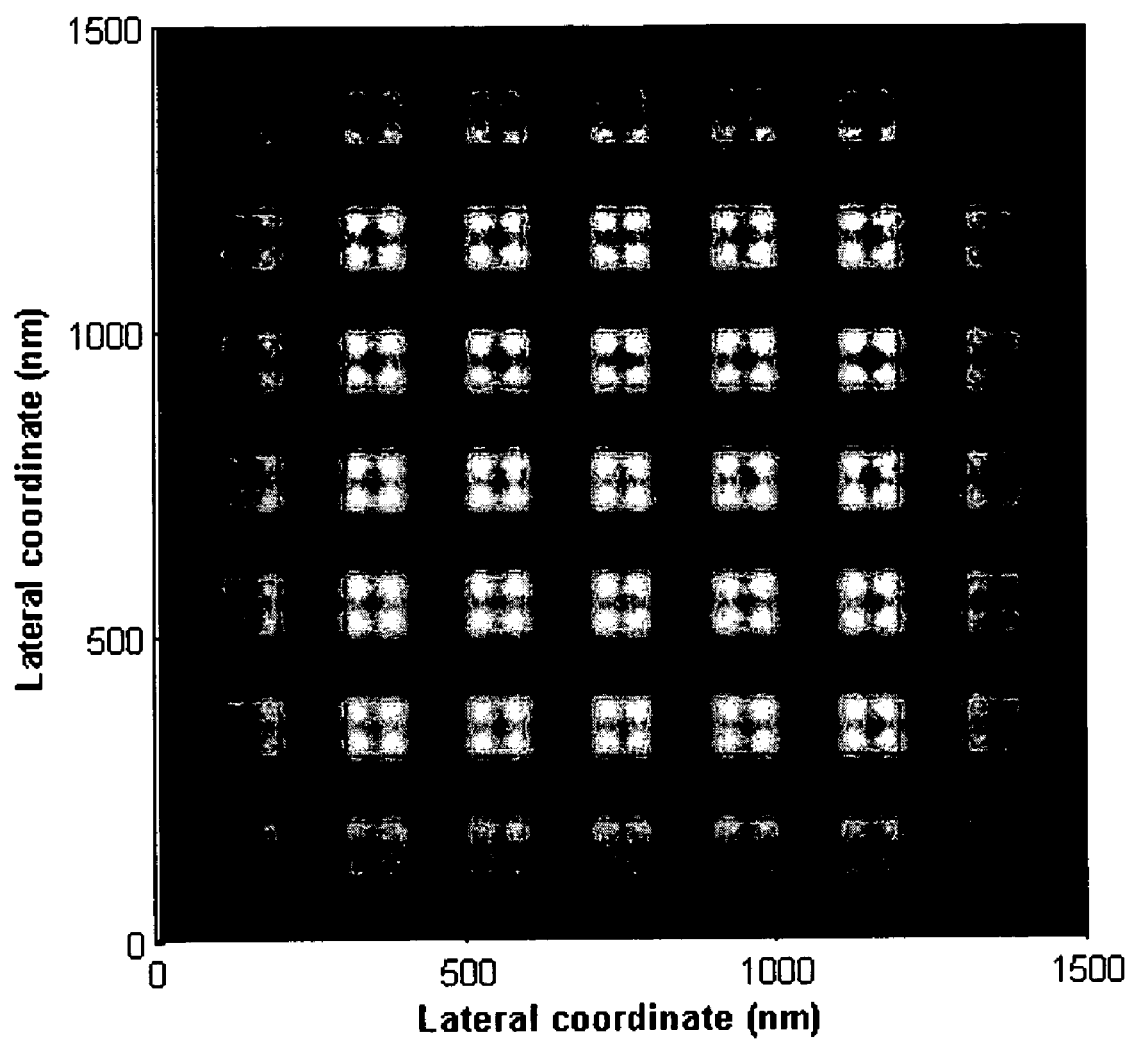
FIG. 11c is a plane view showing an image of the object, which was observed using the confocal self-interference microscopy according to the second embodiment of the present invention.

FIG. 11c shows the results of observing the object of FIG. 11a using the confocal self-interference microscopy having the resolution of 100 nm or less according to the second embodiment of the present invention. At this time, an image will be obtained as an image in which the point spread function of the confocal self-interference microscopy according to the second embodiment of the present invention is convoluted in the image of the object shown in FIG. 11a.

Side lobes have been significantly removed from the point spread function of the confocal self-interference microscopy according to the second embodiment of the present invention. Therefore, from FIG. 11c, it can be seen that the confocal self-interference microscopy according to the second embodiment of the present invention can observe an object closely without the distortion of an original image.

Figure 12A:
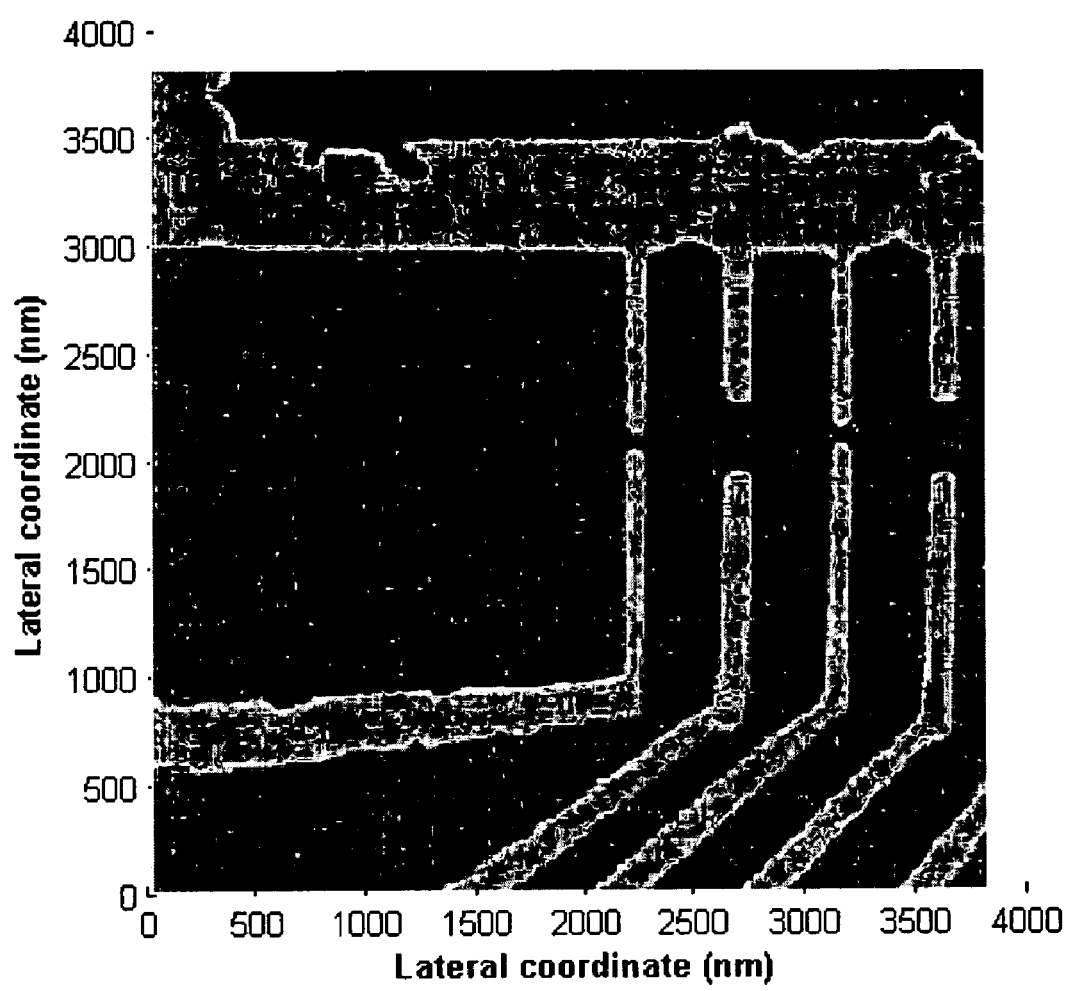
FIG. 12a is a plane view showing an image of a semiconductor circuit.
Figure 12B:
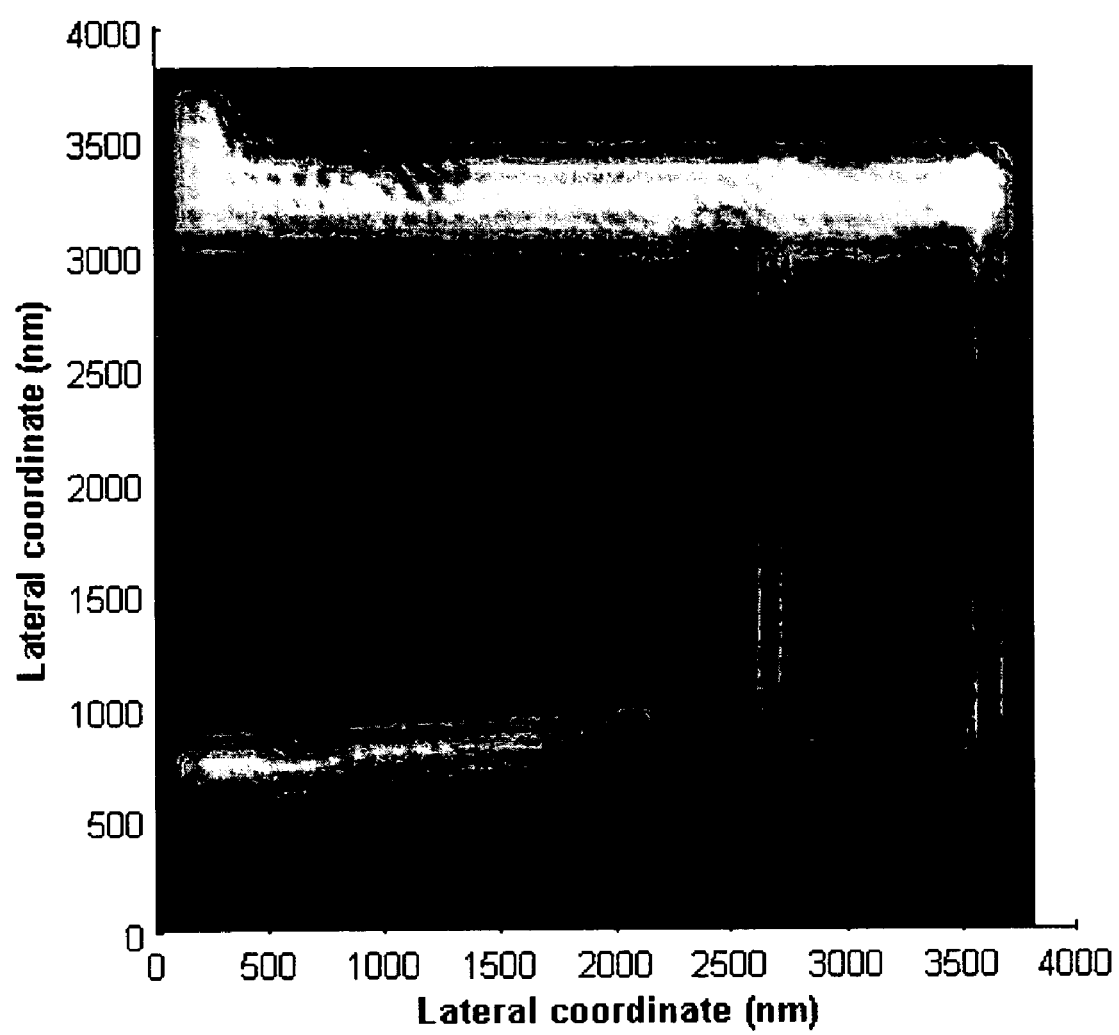
FIG. 12b is a plane view showing an image of the semiconductor circuit, which was observed using an existing confocal self-interference microscopy.
Figure 12C:
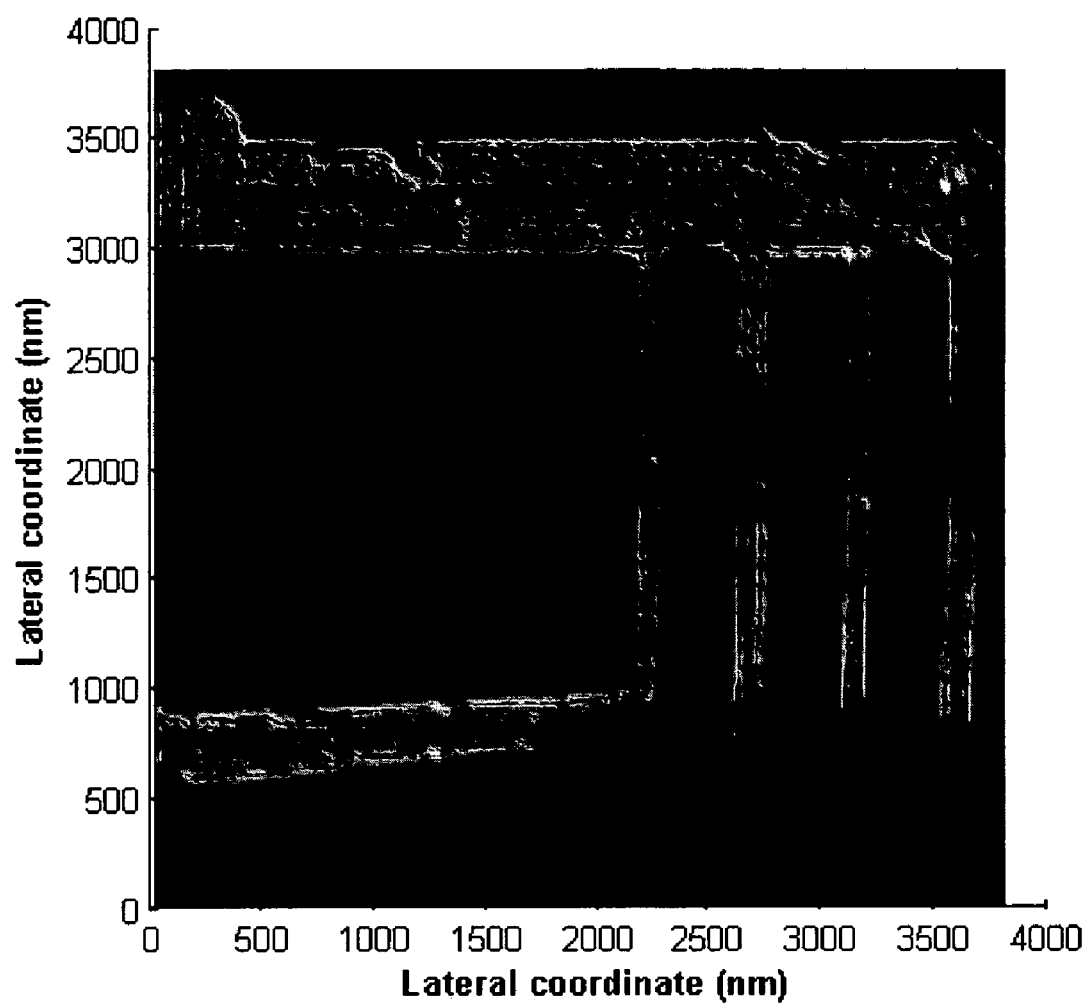
FIG. 12c is a plane view showing an image of the semiconductor circuit, which was observed using the confocal self-interference microscopy according to the second embodiment of the present invention.

FIG. 12a shows an original image of a surface of a semiconductor circuit. In FIG. 12a, a line width of a line on the surface of the semiconductor circuit is several tens of nm. FIG. 12b shows the results of observing the surface of the semiconductor circuit using the confocal self-interference microscopy of the related art method. FIG. 12c shows the results of observing the surface of the semiconductor circuit using the confocal self-interference microscopy according to an embodiment of the present invention.

From FIG. 12, it can be seen that a clear image of the surface of the semiconductor circuit cannot be obtained due to the distortion of side lobes if the confocal self-interference microscopy of the related art method, whereas an image close to an original image can be obtained without the distortion of the image using the confocal self-interference microscopy according to an embodiment of the present invention.

Third Embodiment

Figure 13:
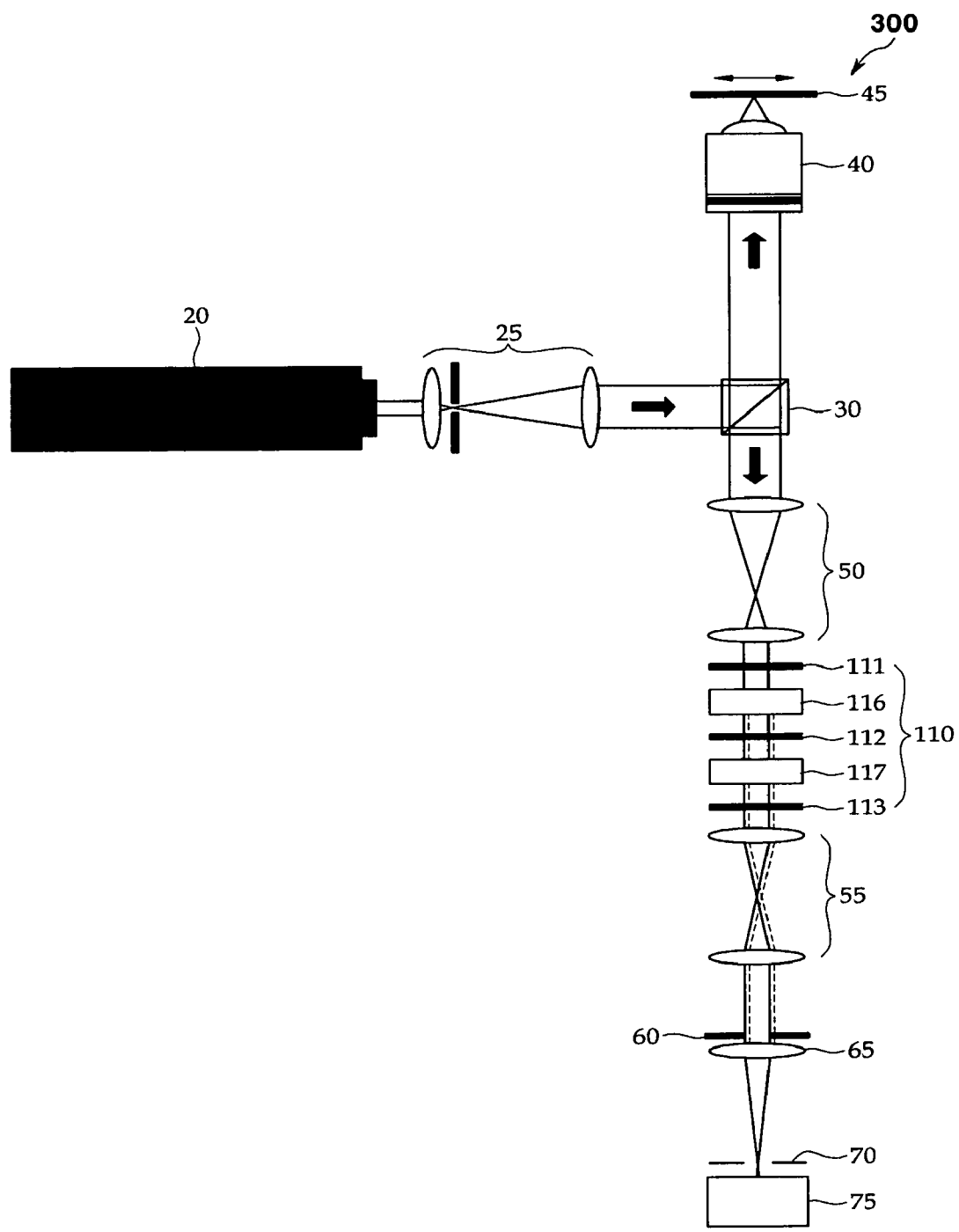
FIG. 13 shows the construction of a confocal self-interference microscopy according to a third embodiment of the present invention.

FIG. 13 shows the construction of a confocal self-interference microscopy 300 according to a third embodiment of the present invention.

As shown in FIG. 13, the confocal self-interference microscopy 300 according to the third embodiment of the present invention includes an illumination unit 20, a beam expander 25, a beam splitter 30, a condenser 40, a specimen 45, a telescope optical system 50, a relay optical system 55, an iris 60, a focusing lens 65, a pin-hole aperture 70, a image detector 75, and a self-interference optical system 110. The self-interference optical system 110 includes polarizers 111, 112, and 113, and birefringence wave plates 116, 117.

The confocal self-interference microscopy 300 according to the present embodiment is the same as the confocal self-interference microscopy 100 of the first embodiment except that the relay optical system 55 is further included between the self-interference optical system 110 and the iris 60. Description on the redundant constituent elements compared with the first embodiment will be omitted and only the relay optical system 55 will be described below.

The relay optical system 55 includes two convex mirrors or concave lens. A beam (a plane wave) that has passed through the self-interference optical system 110 is focused by the former convex mirror or concave lens and is then converted into a plane wave by means of the latter convex mirror or concave lens. The beam of the plane wave proceeds to the iris 60.

In the first embodiment, the iris 60 is used to limit beams with significantly different output locations along the x axis, of beams that have passed through the self-interference optical system 110. However, if the iris 60 is used, light is lost in great quantities because the output location is greatly changed according to variation in an incidence angle.

Furthermore, since a region through which the beam passes through the iris 60 is changed depending on an angle, it is difficult to analyze the resolution. Therefore, there may be a difficulty in designing the confocal self-interference microscopy.

To overcome the above-mentioned drawbacks, in the third embodiment, the relay optical system 55 is used. The two convex lens or concave mirrors are used to cause the beam, which has passed through the self-interference optical system 110, to pass through the center of the iris 60. The relay optical system 55 serves to reduce an amount of light lost and causes the beam to pass through the iris 60 through the same region without regard to an incidence angle. This makes it easy to analyze the resolution.

In the present embodiment, it has been described that the relay optical system 55 is added to the construction of the first embodiment. It is, however, to be noted that the relay optical system 55 may also be added to the construction of the second embodiment.

Fourth Embodiment

Figure 14:
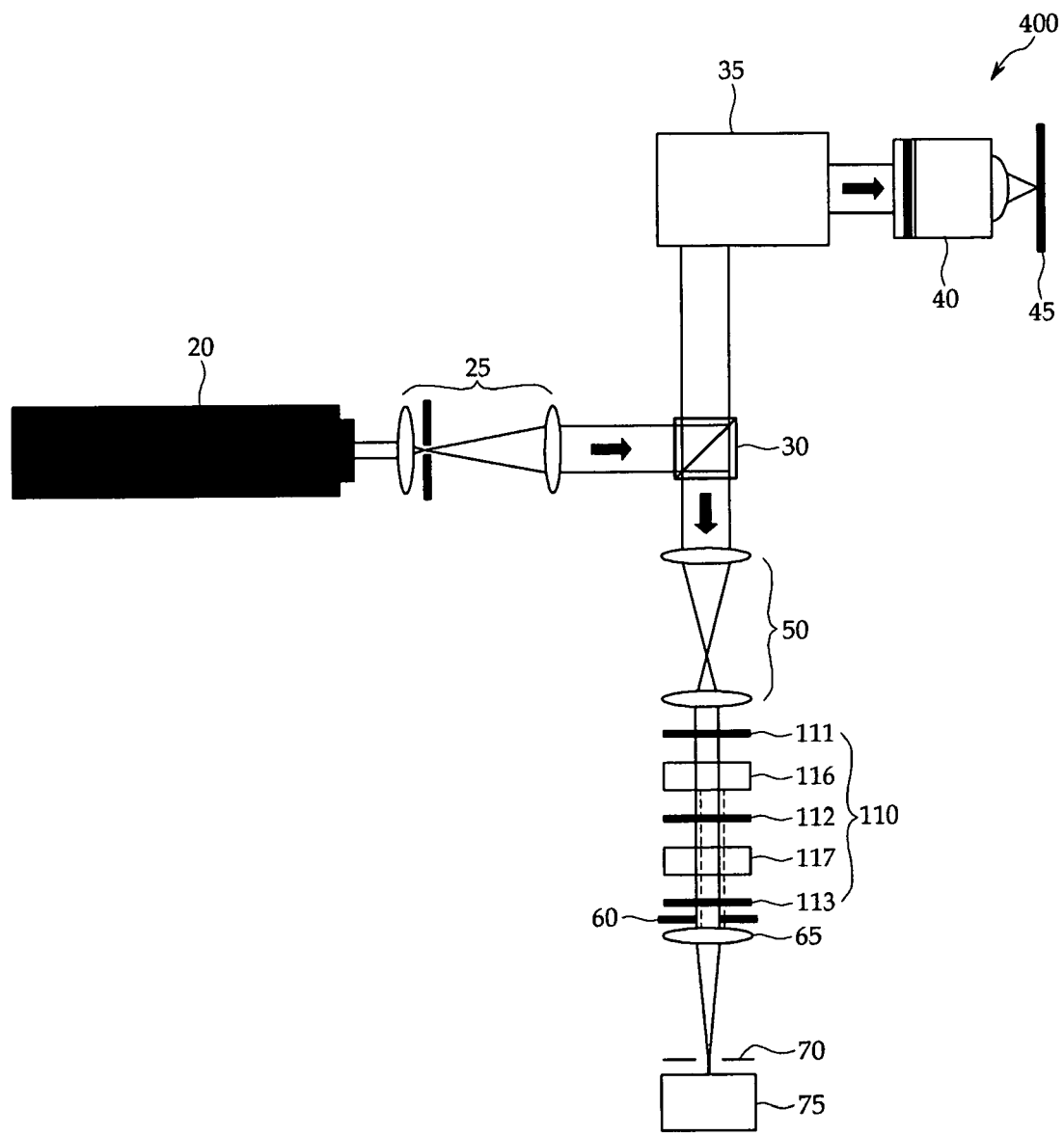
FIG. 14 shows the construction of a confocal self-interference microscopy according to a fourth embodiment of the present invention.

FIG. 14 shows the construction of a confocal self-interference microscopy 400 according to a fourth embodiment of the present invention.

As shown in FIG. 14, the confocal self-interference microscopy 400 according to the fourth embodiment of the present invention includes an illumination unit 20, a beam expander 25, a beam splitter 30, a beam deflection unit 35, a condenser 40, a specimen 45, a telescope optical system 50, an iris 60, a focusing lens 65, a pin-hole aperture 70, an image detector 75, and a self-interference optical system 110. The self-interference optical system 110 includes polarizers 111, 112, and 113, and birefringence wave plates 116, 117.

The confocal self-interference microscopy 400 according to the present embodiment is the same as the confocal self-interference microscopy 100 of the first embodiment except that the beam deflection unit 35 is further included between the beam splitter 30 and the condenser 40. Description on the redundant constituent elements compared with the first embodiment will be omitted and only the beam deflection unit 35 will be described below.

The beam deflection unit 35 includes at least one Galvanometer mirror. The mirror is disposed on the axis of the Galvanometer. The slope of the mirror is controlled by adjusting a current or voltage input to the Galvanometer, thereby changing a light path. If the Galvanometer mirror is used, a location at which illumination beam is focused on an object on the specimen 45 can be controlled by the path of changed illumination beam without the movement of the object.

At this time, one Galvanometer mirror may be mounted so that a location on which focus is brought can be adjusted only in the x axis or y-axis direction of the object, or two Galvanometer mirrors may be mounted so that a location on which focus is brought can be adjusted over the entire surface of the object.

In the present embodiment, it has been described that the beam deflection unit 35 is added to the construction of the first embodiment. It is however to be understood that the beam deflection unit 35 may be added to the construction of the second or third embodiment.

The present invention provides the confocal self-interference microscopy having the resolution of several tens of nm without the distortion of images caused by side lobes, by effectively removing the side lobes of the point spread function of the related art confocal self-interference microscopy. It is therefore possible to significantly improve the resolution of 100 nm or more, of the related art confocal self-interference microscopy.

Furthermore, the confocal self-interference microscopy according to an embodiment of the present invention can observe an object having a structure of several tens of nm and can measure the object under ordianry temperature atmosphere in a non-contact manner in real time. Therefore, the electron microscopy and the atomic force microscopy that have been used 100 nm or less can be replaced. Furthermore, an object having a structure of 100 nm or less can be observed more simply and rapidly and total inspection on a specimen is possible.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A confocal self-interference microscopy, comprising:
    an illumination unit including a light source;
    a specimen;
    an image detection unit for measuring an image of the specimen;
    a beam expanding unit including a convex lens or a concave mirror, for converting a illumination beam from the illumination unit into a plane wave;
    a beam splitter that introduces the illumination beam from the beam expanding unit into the specimen and induces reflected or fluorescent light from the specimen into the image detection unit;
    a condenser located between the specimen and the beam splitter, for condensing the illumination beam from the illumination unit through the beam splitter, irradiating the condensed light onto the specimen, and converting the reflected or fluorescent light from the specimen into a plane wave, the condenser including a convex lens or a concave mirror;
    a self-interference optical system located between the beam splitter and the image detection unit, said self-interference optical system including a first polarizer for polarizing the reflected or fluorescent light from the specimen through the condenser and the beam splitter, a first birefringence wave plate for separating the light from the first polarizer into two beams along a polarizing direction, a second polarizer for polarizing the two beams from the first birefringence wave plate, a second birefringence wave plate for separating the two beams from the second polarizer into four beams along the polarizing direction, and a third polarizer for polarizing the four beams from the second birefringence wave plate;
    an iris located between the self-interference optical system and the image detection unit, for limiting a passage region of the beams that have passed through the self-interference optical system;
    a focusing lens located between the iris and the image detection unit, for focusing the beams from the iris, the focusing lens including a convex lens or a concave mirror; and
    a pin-hole aperture located on a focal plane of the focusing lens between the focusing lens and the image detection unit,
    wherein optic-axes of the first and second birefringence wave plates exist on the same plane, optic-axes of the first and second birefringence wave plates are inclined from an optical axis of the entire optical system at a predetermined angle, and self-interference spatial periods of the first and second birefringence wave plates are different from each other; and
    a relay optical system located between the self-interference optical system and the iris, for re-focusing the beam from the self-interference optical system on the iris, the relay optical system including two convex lens or concave mirrors.

2. The confocal self-interference microscopy as claimed in claim 1, wherein polarizing directions of the first and third polarizers are inclined from the optic-axes of the first and second birefringence wave plates at an angle of 45 degrees, and a polarizing direction of the second polarizer is vertical to the polarizing directions of the first and third polarizers.

3. The confocal self-interference microscopy as claimed in claim 1, wherein the self-interference spatial period of the first birefringence wave plate is half or twice the self-interference spatial period of the second birefringence wave plate.

4. The confocal self-interference microscopy as claimed in claim 1, wherein the self-interference optical system further comprises:
    a third birefringence wave plate for separating the four beams from the third polarizer into eight beams along the polarizing direction;
    a fourth polarizer for polarizing the eight beams from the third birefringence wave plate;
    a fourth birefringence wave plate for separating the eight beams from the fourth polarizer into sixteen beams along the polarizing direction; and
    a fifth polarizer for polarizing the sixteen beams from the fourth birefringence wave plate,
    wherein optic-axes of the third and fourth birefringence wave plates exist on the same plane, a plane on which the optic-axes of the third and fourth birefringence wave plates exist is vertical to the optic-axes of the first and second birefringence wave plates, the optic-axes of the third and fourth birefringence wave plates are inclined from the optical axis of the entire optical system at a predetermined angle, and self-interference spatial periods of the third and fourth birefringence wave plates are different from each other.

5. The confocal self-interference microscopy as claimed in claim 4, wherein the polarizing directions of the first, third, and fifth polarizers are inclined from the optic-axes of the first and second birefringence wave plates at an angle of 45 degrees, and the polarizing directions of the second and fourth polarizers are vertical to the polarizing directions of the first, third, and fifth polarizers.

6. The confocal self-interference microscopy as claimed in claim 4, wherein the self-interference spatial period of the first birefringence wave plate is the same as the self-interference spatial period of the third birefringence wave plate, and the self-interference spatial period of the second birefringence wave plate is the same as the self-interference spatial period of the fourth birefringence wave plate.

7. The confocal self-interference microscopy as claimed in claim 6, wherein the self-interference spatial periods of the first and third birefringence wave plates are half or twice the self-interference spatial periods of the second and fourth birefringence wave plates.

8. The confocal self-interference microscopy as claimed in claim 1, further comprising a telescope optical system located between the beam splitter and the self-interference optical system, for inducing the reflected or fluorescent light, the telescope optical system including two convex lens or concave mirrors.

9. The confocal self-interference microscopy as claimed in claim 8, further comprising a beam deflection unit located between the beam splitter and the condenser, for changing a progress angle of the illumination beam, the beam deflection unit including a Galvanometer.

10. The confocal self-interference microscopy as claimed in claim 1, further comprising a beam deflection unit located between the beam splitter and the condenser, for changing a progress angle of the illumination beam, the beam deflecting unit including a Galvanometer.

* * * * *